G. C. DAVISON.
AIR STARTING VALVE FOR DIESEL ENGINES.
APPLICATION FILED APR. 13, 1916.
1,204,954.
Patented Nov. 14, 1916.
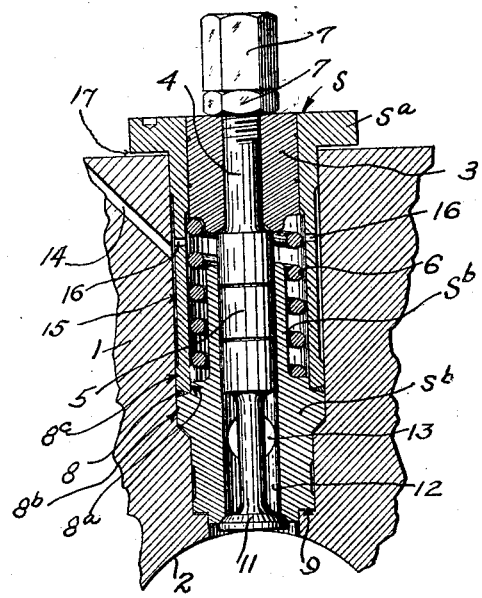
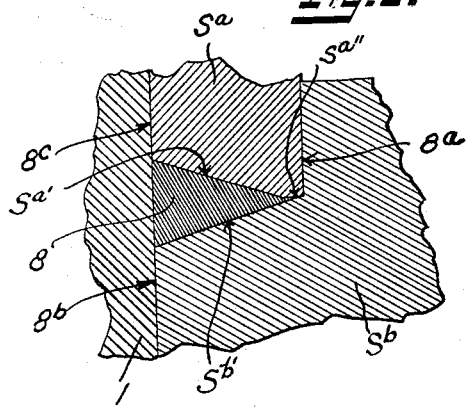
INVENTOR
G. C. Davison,
BY
ATTORNEYS.

UNITED STATES PATENT OFFICE.

GREGORY C. DAVISON, OF NEW LONDON, CONNECTICUT, ASSIGNOR TO ELECTRIC BOAT COMPANY, OF NEW YORK, N. Y., A CORPORATION OF NEW JERSEY.

AIR-STARTING VALVE FOR DIESEL ENGINES.

1,204,954.

Specification of Letters Patent.

Patented Nov. 14, 1916.

Application filed April 13, 1916. Serial No. 90,962.

*To all whom it may concern:*

Be it known that I, GREGORY C. DAVISON, a citizen of the United States, and a resident of New London, in the county of New London and State of Connecticut, have invented certain new and useful Improvements in Air-Starting Valves for Diesel Engines; and I do hereby declare the following to be a full, clear, and exact description of the invention, such as will enable others skilled in the art to which it appertains to make and use the same.

This invention relates to internal combustion engines.

It provides an exceedingly durable air-starting valve, of a novel type, and one adapted for economical and efficient operation in connection with the starting cylinder of a heavy oil internal combustion engine. The valve includes an exceedingly small number of very simple parts.

The invention involves the provision of an air-valve, so designed that the air-pressure tends to balance the valve, a spring being provided for effecting a closure of the valve after the valve has been forced open and then permitted to close by the operation of a cam or the like.

One of the objects of the invention is to provide a construction including a valve-cage which comprises a plurality of overlapping concentric annular members of substantially equal length and which incloses the various working parts of the valve. The two members overlap but slightly, so that the length of the assembled valve-cage is considerably longer than the length of either of such members; the other parts of the valve being so designed that with such a slight overlapping of the members, economy of weight, metal and space is attained, and a ready separation of the annular members is facilitated. After the two annular members are loosely overlapped to the slight extent mentioned, the resulting valve-gage may be inserted into or withdrawn from a suitable recess in a cylinder casting. As a result of the slight overlapping of the two annular members there is attained a very valuable interior construction of the valve-cage. And as a result of this interior construction of the valve-cage, the working parts of the valve are compactly contained in the valve-cage and arranged so that they will be protected against undue wear during operation of the valve and yet be readily accessible by merely removing the outer annular member when the valve needs regrinding or other attention. By the term " valve-cage " is meant any suitable housing for a valve-stem, a piston carried thereby, a piston-guide or follower and the spring above mentioned, but not necessarily a complete housing for the valve disk or the like which coöperates directly with the valve-seat. When the valve-cage is assembled a valve-stem passes through the two annular members. This valve-stem carries a valve-member, a piston and a piston follower. Inside the assembled valve-cage are two fixed cylindrical guiding surfaces, of dissimilar diameters, one to guide the piston and the other to guide the piston follower during operation of the valve. Preferably the guiding surface for the piston follower is inside the outer annular member, and the guiding surface for the piston is inside the inner annular member. According to this construction, the inner member not only provides the last mentioned guiding surface but also a valve-seat for the valve-member on the valve-stem, this valve-seat being arranged at the inner end of the inner member so that the valve-seat may be ground and re-ground with maximum convenience and without necessitating the substitution of any new working parts in the valve.

Another object is to provide an air-starting valve in which but a single gasket is used to prevent air leakage from inside the valve-cage. This gasket is arranged between the inner end of the outer member and an exterior shoulder on the inner member. The joint between such members is such that this joint itself may function to prevent practically all air leakage past the joint when the gasket is injured or destroyed. Such an arrangement is important because while it is desirable to make the gasket of lead, a gasket constructed of this material is fusible at temperatures sometimes reached by the parts to be sealed by the gasket.

A feature of the invention is a design for the gasket, and a disposition thereof relatively to the two annular members, such that when the assembled valve-cage is positioned in the cylinder casting as described, the gasket also prevents air leakage past the gasket through the cylinder casting and therefore renders the provision of an additional gasket between the valve-cage and recess entirely unnecessary.

In the accompanying drawing, Figure 1 is an axial sectional view, showing an embodiment of the invention at present preferred and successfully employed in connection with a heavy oil internal combustion engine of the marine type; and Fig. 2 is an enlarged detail view showing certain of the parts of Fig. 1.

The reference numeral 1 indicates a portion of the starting cylinder of an internal combustion engine, the interior of the cylinder being indicated by the line 2. Such a cylinder casting usually has a well or deep recess therein for the reception of an air-starting valve.

The cage or casing of the valve consists of two annular members or sleeves designated $S^a$ and $S^b$ which are of substantially equal length and adapted to fit snugly within the recess or well formed in the cylinder wall. The outer sleeve $S^a$ has a guiding surface for an annular piston-follower 3 mounted on the outer end of a valve-stem 4. The inner sleeve $S^b$ has a guiding surface for a piston 5 on the same valve-stem 4. This inner sleeve $S^b$ includes a main thick portion and a reduced annular upstanding extension. As a result of this construction, piston 5 is served by a comparatively long guiding surface in the inner sleeve $S^b$. At the same time, sleeves $S^a$ and $S^b$ coöperate to provide between them a deep annular chamber which receives an expansile spring 6, thus insuring that no portion of the spring will ever come into contact with piston 5. This spring 6 is further held in position by having its upper end received in an annular groove in the inner end of piston-follower 3. Nuts 7, adjustable upon the outer end of stem 4, clamp the piston-guide 3 fast against the piston 5. While sleeve $S^a$ overlaps the sleeve $S^b$ somewhat, the overlapping portions contact over only a comparatively short distance, and the length of the valve-cage as a whole is considerably greater than the length of either of the sleeves $S^a$ and $S^b$.

The inner end of outer sleeve $S^a$ is shaped as shown most clearly in Fig. 2. The inner end of the sleeve is first beveled as indicated at $S^{a\prime}$, and then the beveled portion is ground fine to form a flat annulus $S^{a\prime\prime}$ having a width of about five-thousandths of an inch. The shaped inner end of sleeve $S^a$ rests upon a shoulder $S^{b\prime}$ of the inner sleeve $S^b$, the shoulder $S^{b\prime}$ being beveled as indicated in Fig. 2. A ring-like lead gasket 8, of triangular cross-section, is interposed between the inner end of sleeve $S^a$ and the shoulder $S^{b\prime}$ of sleeve $S^b$. When the two sleeves are joined as illustrated, they form a valve-cage S; and after this cage is inserted in its receiving recess in cylinder wall 1, the two sleeves are clamped together and the valve-cage is anchored fast in the recess by suitable bolts (not shown) passing through an outer flange on sleeve $S^a$ and into or through the cylinder casting. When the two sleeves are thus clamped together, sleeve $S^a$ is caused to sink its flat annulus $S^{a\prime\prime}$ into the beveled shoulder $S^{b\prime}$ of sleeve $S^b$, the gasket 8 being compressed at the same time. The compressed gasket 8 not only seals the joint between the sleeves $S^a$ and $S^b$, but also seals the outer end of the recess in the cylinder wall 1 against communication with the inner end of such recess. In other words, this gasket 8 seals all the three passages $8^a$, $8^b$ and $8^c$ of Fig. 2. Moreover, irrespective of the presence of gasket 8, the joint is such that the hard metal of sleeve $S^a$ is in close contact with the hard metal of sleeve $S^b$, and therefore the joint is made sufficiently leak-proof for emergency running, should the temperature of the other parts become so high that the lead gasket is fused. If desired, an additional gasket 9 may of course be interposed between the valve-cage S and the bottom of the recess in cylinder wall 1. If used, this additional gasket 9 is preferably of copper asbestos. The inner end of inner sleeve $S^b$ carries a conical valve-seat for coöperation with a disk-valve 11 on valve-stem 4.

When the valve is assembled, a chamber 12 is formed between the piston 5 and the disk-valve 11, and when the assembled valve is positioned in its receiving recess, a port 13 arranged transversely of inner sleeve $S^b$ registers with a similar port in the cylinder casting, so that a suitable air-line connected to the port in the cylinder casting is in open communication with the chamber 12.

An oil hole 14 may be provided in the cylinder casting, communicating at its inner end with an annular well 15 between the valve-cage and its receiving recess. A plurality of ports 16, near the outer end of the annular well 15, are formed in the outer sleeve $S^a$, so that oil in the annular well 15 may enter the valve-cage S and lubricate the working parts of the valve during operation of the latter.

During running of the engine, the valve is closed by spring 6 except at such times as the stem 4 moves inward to unseat the disk-valve 11. The stem may be thus moved by any suitable actuator, as for instance, a lever rocked by a cam or the like controlled by the engine shaft. Starting air under proper pressure is in the chamber 12 at all times, but the under-surface of piston 5 and the upper surface of disk-valve 11 are so related that if the spring 6 were omitted the valve would be substantially balanced. The spring 6, however, always urges the disk-valve 11 to close against its seat. Therefore, when the valve-stem 4 is moved inwardly by the actuator referred to, the spring 6 is compressed; and as soon as the actuator releases the valve-stem 4, the spring 6 instantly seats the disk-valve 11 and thus causes the air supply to be shut off. There is thus provided a valve-cage which as one unit may be inserted into, withdrawn from, or adjusted relatively to its receiving recess in cylinder wall 1. The valve-cage contains all the various working parts of the valve in such a way that no derangement of these parts may possibly occur. The working parts are compactly assembled, and are protected against wear as the result of useless friction. For instance, the spring 6 must be correctly positioned when the valve-cage is assembled and after being thus positioned the spring cannot accidentally become displaced so as to rub against piston 5. It will be noted that the two sleeves which make up the valve-cage S are readily separable, practically at the middle of the cage. If for any reason it is desired to obtain access to the spring 6 or to the piston follower 3, or even to replace the gasket 8, it is merely necessary to remove the above mentioned clamping bolts and then insert a suitable tool in the space 17 to lift outer sleeve S$^a$ out of the recess within which the valve-cage is positioned. To regrind the valve-seat for the disk-valve 11, however, it is advisable to remove the entire valve-cage first; but then the valve-seat may be ground with utmost convenience. Of course after many regrindings of the valve-seat, its location may be changed considerably, but even so, neither of the sleeves S$^a$ and S$^b$ nor any of the working parts of the valve need be discarded or correspondingly altered.

The ease of assembly and disassembly is obvious. To take the valve apart, it is merely necessary to unscrew nuts 7, slip the piston follower up and free from the stem 4, withdraw the stem down through the bore of sleeve S$^b$, separate the two sleeves, and lift up the spring 6 and gasket 8.

I claim:

1. In an air-starting valve, the combination of two partially overlapping annular members forming a valve-cage, and means for forcing the members together, one of the members having a beveled shoulder upon which is mounted one end of the other member, and said end of the last-mentioned member being formed to include a flat annulus and a bevel, so that when the two members are forced together the annulus of the one member will bite into the beveled shoulder of the other member.

2. In an air-starting valve, the combination of two slightly overlapping annular members forming a valve-cage, and means for forcing the members together, one of the members having an exterior beveled shoulder upon which is mounted one end of the other member at a point substantially at the middle of the valve-cage, and said end of the member last-mentioned being formed to include a flat annulus and a bevel, so that when the two members are forced together the annulus of the one member will bite into the beveled shoulder of the other member.

3. In an air-starting valve, the combination of two partially overlapping annular members forming a valve-cage, and an annular gasket of soft metal, as lead, of triangular cross-section, located between the two members, the first member having a beveled exterior shoulder at a point substantially at the middle of the valve-cage, and one end of the other member being beveled and resting upon the beveled exterior shoulder of the first member, so that the two members may be forced together into contact with the gasket and also into contact with each other along a circular line adjacent to the gasket.

4. In an air-starting valve, the combination of overlapping annular members forming a valve-cage, and an annular gasket of soft metal, as lead, of triangular cross-section, located between the two members, one of said members having an exterior beveled shoulder upon which the gasket is mounted and one end of the other member being beveled and mounted on the gasket so that the two members may be forced together to compress the gasket and directly contact with each other along a circular line which is adjacent to the thinnest portion of the gasket.

5. In an air-starting valve, in combination, a valve-cage consisting of inner and outer and partially overlapping annular members, the inner member having an intermediate exterior shoulder upon which one end of the outer member is mounted and also having a valve-seat, a valve-stem carrying a valve-member for the valve-seat, a piston on the valve-stem working in the inner member, a piston-follower on the valve-stem working in the outer member, and a spring arranged between the inner member, the outer member and the piston-follower for urging the valve-member to its seat.

6. In an air-starting valve, in combination, a valve-cage consisting of inner and outer and partially overlapping annular members, the inner member having an interior guiding surface for a piston and having a valve-seat formed in its lower end-face and the outer member having an interior guiding surface for a piston, a valve-stem carrying a valve-member for the valve-seat, a piston for coöperation with the first mentioned guiding surface, a second piston for coöperation with the second mentioned guiding surface, the two members being so shaped that an annular well is formed between them around the valve-stem, and a spring arranged in the well and between the two members and one of the pistons for urging the valve-member to its seat.

7. In an air-starting valve, in combination, a valve-cage consisting of inner and outer and partially overlapping annular members, the inner member having an interior guiding surface for a piston and having a valve-seat formed in its lower end-face and the outer member having an interior guiding surface for a piston, a valve-stem carrying a valve-member for the valve-seat, a piston for coöperation with the first mentioned guiding surface, a second piston for coöperation with the second mentioned guiding surface, the two members being so shaped that an annular well is formed between them around the valve-stem, and a spring arranged in the well and between the two members and one of the pistons for urging the valve-member to its seat, the last-named piston having an annular recess in its inner end so that the recess and the well coöperate to maintain the spring concentric with the valve-stem.

8. In an air-starting valve, the combination of inner and outer annular tubular members, the inner one having an exterior shoulder upon which the end of the outer one is seated, means coacting with the outer tubular member and with the support for the valve for forcing the outer member against the shoulder upon the inner one and thereby seating the valve upon the support, an annular extension upon the inner tubular member projecting within the outer tubular member and forming a chamber between them, a spring located in the chamber, a stem adapted to reciprocate within the inner tubular member and carrying a valve-member which coöperates with a seat upon the inner tubular member, and a piston secured upon said stem and engaging one end of said spring and adapted to reciprocate within the outer tubular member.

In testimony whereof I affix my signature.

GREGORY C. DAVISON.

Copies of this patent may be obtained for five cents each, by addressing the "Commissioner of Patents, Washington, D. C."